UNITED STATES PATENT OFFICE.

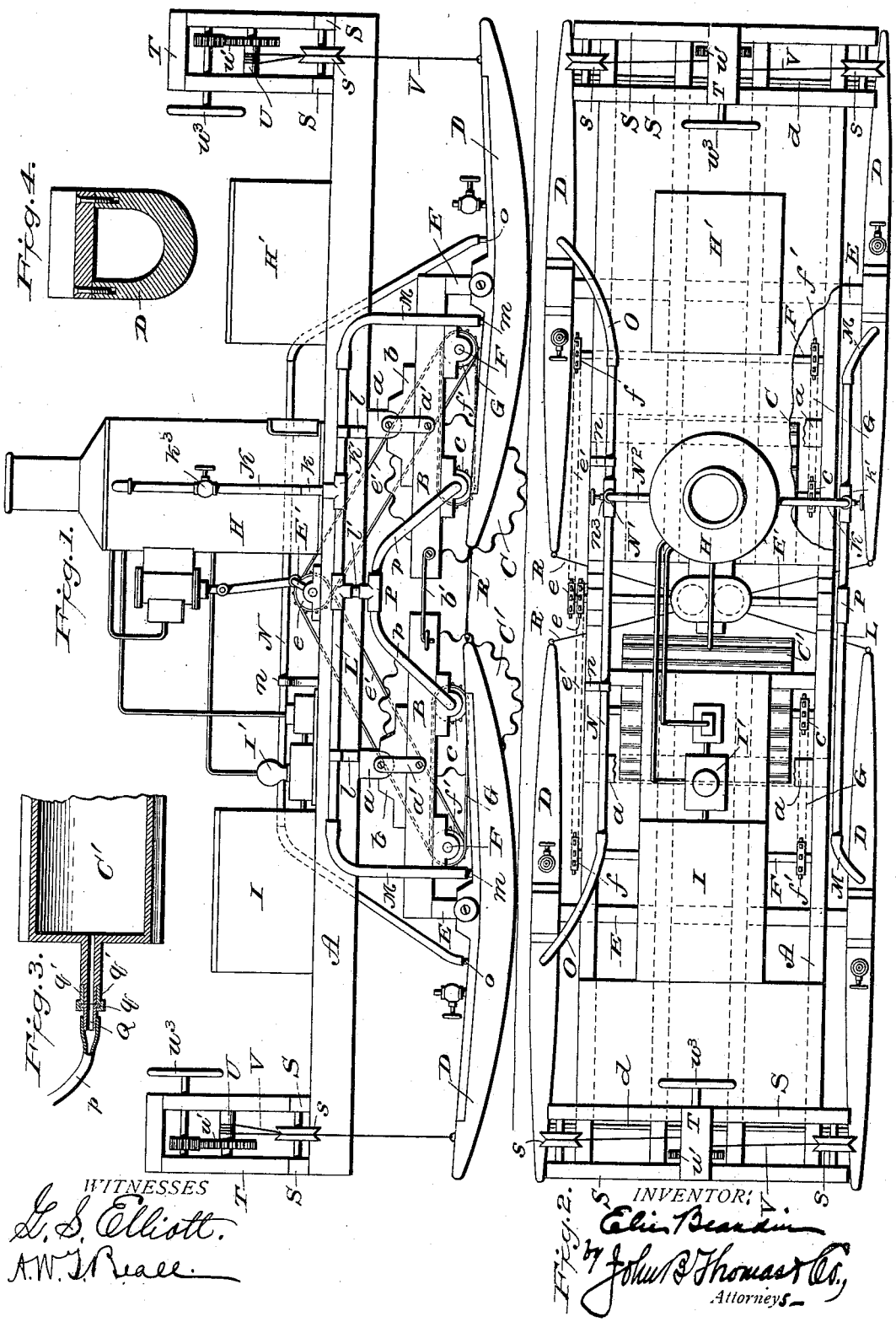

ELIE BEAUDIN, OF RHINELANDER, WISCONSIN, ASSIGNOR OF ONE-HALF TO A. B. BAKER, OF SAME PLACE.

STEAM-PROPELLER SLEIGH.

SPECIFICATION forming part of Letters Patent No. 618,771, dated January 31, 1899.

Application filed November 19, 1898. Serial No. 696,859. (No model.)

*To all whom it may concern:*

Be it known that I, ELIE BEAUDIN, a citizen of the United States of America, residing at Rhinelander, in the county of Oneida and State of Wisconsin, have invented certain new and useful Improvements in Steam-Propelled Sleighs; and I do hereby declare the following to be a full, clear, and exact description of the invention, such as will enable others skilled in the art to which it appertains to make and use the same.

The object of this invention is to provide a steam-propelled vehicle or sleigh which is especially adapted for use in northern countries, where for a greater part of the year the roads are covered with snow, making travel by ordinary vehicles very difficult, particularly in hauling heavy burdens, the improved vehicle or sleigh forming a substantial track or practically a traction-road, over which it passes. The steam-sleigh also makes it practical to form a traction-road over the ice on a frozen river, taking the place of a steamboat line in hauling freight, it being contemplated to provide a train of sleighs which are coupled in the usual manner to the motor-sleigh.

To accomplish the above objects and such others to which the invention may pertain, the same consists of a body or frame supporting a boiler, engine, and other apparatus and trucks upon which the body or frame is mounted, said trucks having runners and fluted rollers which are hollow and connected by pipes to the boiler in order to be supplied with steam for the purpose of partly melting the snow that it may be molded by the runners and rollers and then permitted to freeze, forming a corrugated middle track and smooth side tracks.

The invention further consists in the particular construction and combination of parts constituting my improved steam-sleigh, all as hereinafter fully described, and particularly set forth in the appended claims.

In the accompanying drawings, which form a part of this specification and wherein like letters of reference indicate like parts throughout the several views, Figure 1 is a side elevation of a steam-sleigh constructed in accordance with my invention. Fig. 2 is a plan view of the same. Fig. 3 is a detail sectional view of one end of one of the rollers. Fig. 4 is a transverse sectional view through one of
the runners.

With particular reference to said drawings, A designates the body or platform of the sleigh, upon which are mounted the boiler, engines, and other apparatus hereinafter described, the said body being pivotally mounted upon a pair of trucks B B, located one in front of the other, and to this end the said body is provided on its under side with transverse bars or bolsters *a a*, rounded at their ends to rock in bearing-blocks *b b*, secured upon the longitudinal side pieces of the trucks. The body is connected to the trucks by links *a'*, which are pivoted to the bolsters of the body and side pieces of the truck and do not interfere with the rocking movement of the trucks, while the said trucks are coupled to each other by hooks *b'*, which also do not interfere with an independent rocking movement. Journaled in bearings at the forward part of the rear truck is a fluted roller C, while a similar roller C' is journaled in bearings at the rear end of the forward truck, it being noted that the location of said fluted or ground rollers with respect to the respective fulcrum of the trucks is such as to permit said rollers to pass over an obstruction without disturbing the level of the body or platform. The trucks are further supported by runners D, a set for each truck, the said runners being journaled centrally to the ends of axles E, pivoted to the forward end of the front truck and rear end of the rear truck, respectively. These runners are wide in order to have a broad bearing upon the snow or ice, and besides forming an additional support for the sleigh also serve to guide the same, as will hereinafter appear. Each set of runners is firmly connected to each other at one end by a rigid cross-bar *d*, and both the runners and fluted rollers are made hollow to receive steam, which heats them for the purpose of partly thawing the snow in order that it may be molded by the rollers and runners to form a solid road-bed. It will also be noted that the bearing of the body or platform upon the trucks and connection of the ground-rollers and runners to the trucks with respect to said bearing throws about two-thirds of the weight of the sleigh upon the rollers.

The sleigh is propelled by vertical engines of any approved type of construction, which are connected to a double crank-shaft E′, journaled in bearings attached to opposite sides of the platform, the said shaft being extended at one end to receive small sprocket-wheels $e\ e$, connected by sprocket-chains $e'$ to sprocket-wheels $f$ on transverse shafts F, journaled in the trucks B, the said transverse shafts being geared directly to the rollers by sprocket-chains G, which pass over sprocket-wheels $c$ on one of the stub-axles of the rollers and smaller sprocket-wheels $f'$ on the shafts. The steam-engines are supplied with steam from an upright boiler H, mounted on the body or platform and provided with the usual fire-pot, a fuel-box H′ being mounted on the platform adjoining the boiler. At the opposite end of the sleigh from the fuel-box is located a water-tank I for supplying water to the said boiler through the interposition of a pump I′, operated by steam from the boiler. The boiler H also supplies steam to the hollow ground-rollers and runners for the purpose hereinbefore mentioned, and for this purpose a pipe K extends from one side of said boiler and is connected by a flexible pipe-section $k$ and T-coupling $k'$ to a horizontal pipe L, supported in brackets $l$ at one side of the platform. This horizontal pipe is connected at its ends to flexible pipes M M, extending from nipples $m$, let into the runners at one side of the sleigh. The runners at the other side of the sleigh are supplied with steam from a horizontal pipe N, mounted above the platform in standards $n$ and connected to the boiler by flexible pipe N′ and elbow-pipe N², the connection between the horizontal pipe N and runners on that side being by flexible pipes O, extending from nipples $o$. The elbow-pipes K and N² are provided with globe-valves $k^3$ and $n^3$, respectively, for controlling the admission of steam into the horizontal pipes. In order to supply steam to the fluted rollers, the horizontal pipe L is provided centrally with a depending section $l'$, connected to a short horizontal pipe P, and to the ends of this horizontal pipe are connected flexible pipes $p\,p$, which are coupled at their other ends to thimbles Q, let into the stub-shafts at one end of the fluted rollers and rotatable therein. To this end the thimbles are provided with annular flanges $q$, contained between annular plates $q'$, attached to the ends of said stub-shafts, suitable packings being provided to prevent the escape of steam. This manner of connecting the flexible pipes to the fluted rollers does not interfere with the rotation of the rollers.

In order that the runners D may be employed in guiding the sleigh, they are connected to each other by cross-wires R, so that the operation of one set of runners will properly turn the other set, and the operation is effected from either end of the sleigh through the intervention of duplicate steering mechanism, which I shall now proceed to describe, and as the steering mechanism at one end of the sleigh is identical with that at the other end a description of one will answer as well for the other, the reference-letters referring to like parts.

Extending transversely across the body or platform of the sleigh at either end thereof are sill-pieces S S, projecting beyond the sides of said platform and supporting grooved guide-rollers $s\ s$. Upon the center of the sill-pieces is mounted a frame T, supporting a drum or windlass U, from which pass wire ropes or flexible connections V V, being led over the guide-rollers $s\ s$ and brought back under the body or platform and attached to the ends of the runners. It will be understood that the ropes are wound upon the windlass in opposite directions in order that when one rope is drawn upon the other is being paid out. The windlass comprises the drum $u$, large gear-wheel $u'$ on said drum, a pinion in mesh with said gear-wheel and keyed to a horizontal shaft, and a hand-wheel $u^3$ upon the inner end of the horizontal shaft.

The runners are preferably made up of two castings or shells bolted together, as shown, leaving the said runners hollow, so as to receive steam, which heats the shoe or lower half. The said runners are also provided with blow-off cocks for the purpose of letting out the steam, and it will be noted that the runners are so shaped that the sleigh can be propelled in either direction.

From the foregoing description, in connection with the accompanying drawings, it will be noted that I have devised a steam-sleigh which can be propelled by steam, and in passing over snow will form a hard traction-road, giving a good grip for the fluted rollers upon a subsequent trip of the sleigh, while the runners form smooth tracks at each side of the corrugated road formed by the rollers. This will make a road for the steam-sleigh, so that it can be used with good effect in hauling burdens, and is particularly adapted for lumber regions, where the felling of the trees can be carried on for the greater part of the year and carried to the mills in the winter. The steam-sleigh may also be run upon a frozen river and provides an economical means of transporting merchandise, &c., as it can readily form a good and substantial track.

Having thus described my invention, what I claim as new, and desire to secure by Letters Patent, is—

1. In a steam-sleigh, the combination of the trucks, fluted rollers mounted in the trucks, and runners connected to said trucks; together with an engine and gearing for driving the fluted rollers, substantially as shown and for the purpose set forth.

2. In a steam-sleigh, the combination, of the platform or body, trucks pivotally connected thereto, fluted rollers mounted in the trucks, and runners connected to said trucks; together with a steam-engine mounted on the body of the sleigh, and gearing for driving the fluted rollers from the engine, substantially as shown and for the purpose set forth.

3. A steam-sleigh for the purpose set forth, comprising a body supported upon trucks, fluted rollers mounted in the trucks, said rollers being hollow, a boiler and engine for driving the rollers, and a steam-pipe leading from the boiler to the fluted rollers, substantially as shown and described.

4. A steam-sleigh for the purpose set forth, comprising a body supported upon trucks, fluted rollers mounted in the trucks, and runners forming additional supports for the sleigh, the rollers and runners being hollow; together with a boiler and engine mounted on the sleigh, gearing between the engine and fluted rollers, and steam-pipes connecting the boiler to the hollow rollers and runners, substantially as shown and described.

5. A steam-sleigh for the purpose set forth, comprising a body or platform supported upon trucks, hollow fluted rollers mounted in the trucks being journaled in suitable supports, axles pivoted to the ends of said trucks, and hollow runners pivoted on the ends of the axles; together with a boiler and engine mounted on the sleigh, gearing between the engine and fluted rollers, and steam-pipes connecting the boiler to the hollow rollers and runners, the sleigh also supporting water-tank, fuel-box, feed-pump, &c., substantially as shown and described.

6. A steam-sleigh for the purpose set forth, comprising a body or platform supported upon trucks, hollow fluted rollers journaled in the trucks, axles pivoted to the ends of said trucks, and hollow runners mounted on the ends of the axles, cross-wires connecting the sets of runners, and steering mechanism connected to either set of runners, substantially as shown; together with a boiler and engine mounted on the sleigh and means for gearing the engine to the fluted rollers, the boiler being connected to the hollow rollers and runners by steam-pipes, substantially as set forth.

7. A steam-sleigh for the purpose set forth, comprising a body or platform, trucks pivotally connected to said platform, fluted rollers journaled in bearings carried by the trucks, said rollers being hollow and located at the adjoining ends of the trucks; together with a boiler and steam-engine mounted on the sleigh, gearing between the engine and fluted rollers, and steam-pipes connecting the boiler with the hollow fluted rollers, substantially as shown and described.

8. A steam-sleigh for the purpose set forth, comprising a body or platform, trucks pivotally connected to said platform, fluted rollers journaled in bearings carried by the trucks, said rollers being hollow and located at the adjoining ends of the trucks, and hollow runners connected to axles pivoted to the opposite ends of the trucks; together with a boiler and engine mounted on the sleigh, gearing between the engine and fluted rollers, and steam-pipes connecting the boiler to the hollow rollers and runners, substantially as shown and described.

9. A steam-sleigh for the purpose set forth, comprising a body or platform, trucks pivotally connected to said platform, fluted rollers journaled in bearings carried by the trucks, said rollers being hollow and located at the adjoining ends of the trucks, and hollow runners connected to axles pivoted to the opposite ends of the trucks, a boiler and engine mounted on the sleigh, sprocket wheels and chains gearing the engine to the fluted rollers; together with steering mechanism comprising a windlass having ropes passing over guide-rollers and attached at their ends to the ends of the runners, the sets of runners being connected by cross-wires, substantially as shown and described.

10. In a steam-sleigh for the purposes set forth, of the hollow runners made in two parts bolted together, blow-off cocks on said runners, and cross-wires connecting the sets of runners together; together with the hollow fluted rollers having a hollow stub-shaft, a thimble let into said stub-shaft and connected by pipe to a boiler mounted upon the sleigh, and steam-pipes connecting the boiler to the hollow runners, substantially as shown and for the purpose set forth.

11. A steam-sleigh for the purpose set forth, comprising a body or platform having transverse bolsters, trucks with bearing-plates having recesses in which the bolsters rest, links connecting the body to the trucks, and hollow fluted rollers journaled in bearings at the adjoining ends of the trucks; together with runners attached to the trucks, a boiler and engine on the sleigh, gearing between the engine and fluted rollers, and steam-pipes connecting the hollow fluted rollers to the boiler, substantially as shown and for the purpose set forth.

In testimony whereof I affix my signature in presence of two witnesses.

his
   ELIE × BEAUDIN.
      mark

Witnesses:
 PAUL BROWNE,
 D. R. THOMSON.